L. P. TENCA.
DIPPING MACHINE.
APPLICATION FILED AUG. 24, 1918.

1,332,934.

Patented Mar. 9, 1920.
9 SHEETS—SHEET 6.

UNITED STATES PATENT OFFICE.

LOUIS P. TENCA, OF CLEVELAND, OHIO, ASSIGNOR TO THE GLIDDEN COMPANY, OF CLEVELAND, OHIO, A CORPORATION OF OHIO.

DIPPING-MACHINE.

1,332,934. Specification of Letters Patent. Patented Mar. 9, 1920.

Application filed August 24, 1918. Serial No. 251,216.

*To all whom it may concern:*

Be it known that I, LOUIS P. TENCA, a citizen of the United States, and a resident of Cleveland, in the county of Cuyahoga and State of Ohio, have invented certain new and useful Improvements in Dipping-Machines, of which the following is a specification.

My invention relates to dipping machines, particularly to that class of machines adapted for supporting a great number of articles and dipping them into a tank containing coating liquid.

The object of my invention is to produce a simple, reliable and efficient machine for accurately supporting articles to be coated and for carrying them in such manner with reference to the coating tank that uniform, smooth and finished coating is assured.

The various features of my invention are clearly disclosed on the accompanying specification together with the drawings, in which drawings—

The supporting structure for the various operative parts comprises two side frames, top connecting beams, and braces. The side frames A and A' comprise each the uprights 20 and 21 and the cross braces 22. The frames are connected together at their tops by the longitudinally extending side beams 23 and 24 and the outward transverse beams 25 and 26. A distance inside of these side beams the front and rear beams 23 and 24 are connected by the transverse beams 27 and 28. Suitable braces 29 connect the longitudinal beams with the legs 21 and 22, and at their lower ends these legs seat in socket frames 30 which are secured to the floor 31. On top of the machine at the left side thereof a bearing fitting or frame 32 is mounted on and secured to the cross beams 25 and 27 in which frame is journaled at its upper end the screw shaft 33 which within the frame supports the worm wheel 34. The screw shaft 33 is journaled at its lower end in the bearing 35 supported on the side frame A. At the right side of the machine a bearing frame 36 is mounted on and secured to the cross beams 26 and 28, and the screw shaft 37 is journaled at its upper end in said frame and supports a worm wheel 38, the screw shaft at its lower end being journaled in a manner similar to that of the screw shaft 33. Extending longitudinally across the top of the machine and journaled at its ends in the bearing frames 32 and 36 is the shaft 39 which within the bearing frame has secured thereto the worms 40 and 41 which mesh with the worm wheels 34 and 38 respectively. At its left end the shaft 39 is journaled in the upper part of bearing bracket 42 and has secured thereto a bevel gear 43 which meshes with a bevel gear 44 at the upper end of the vertical shaft 45 which at is upper end is journaled in the bracket 42 and at its lower end in the bracket 46, the bevel pinion 47 being secured to the lower end of the shaft.

At the left end of the machine two bearing frames 48 and 49 depend from the cross brace 22ᵃ of the frame A and journal the horizontal shaft 50 on which is secured the bevel gear 51 with which the gear 47 on shaft 45 meshes. Between the bevel gear 51 and the bearing 48 the bevel gears 52 and 53 are supported on shaft 50, these gears being rotatable on the shaft but locked against longitudinal movement. Between these gears the clutch sleeve 54 is shiftable and has pins or keys 55 engaging in the key way 56 of the shaft so that the sleeve and shaft always rotate together. At its left end the sleeve has clutch teeth 57 for coöperating with the clutch teeth 58 in the gear 52, while at its other end the sleeve has clutch teeth 59 for coöperating with the clutch teeth 60 of the gear 53. A bracket 61 extends upwardly from the cross brace 22^b of the frame A and at the top of this bracket the clutch lever 62 is pivoted and has the fork 63 for engaging in the peripheral channel 64 of the clutch sleeve 54. When this lever is swung the clutch sleeve is shifted to connect either the gear 52 or 53 in driving connection with the shaft 50.

Journaled in the ends of the inverted U-frame 65 is the shaft 66 supporting at its inner end the bevel gear 67 which meshes with the bevel gear 52. At its outer end this shaft 66 supports the sprocket wheel 68 which is connected by chain 69 with the sprocket pinion of the electric motor M which is mounted on a supporting bracket 70 secured to the side frame A. In front of the frame 65 is the inverted U-frame 71 in whose ends is journaled the shaft 72 which is parallel with the shaft 66 and at its inner end supports the bevel pinion 73 which meshes with the gear 53 on shaft 50. The frames 65 and 71 are rigidly supported by means of arms 74 secured to and extending from the cross brace 22^a, and by braces 75 secured to and extending down from the cross brace 22^c of the frame A. The arms 74 and 75 are held properly spaced apart at their ends by sleeves 76 and 77 respectively, the bolts 78 and 79 extending through these sleeves and the frames 65 and 71, respectively.

On shaft 66 the transmission gears 80^a, 80^b, 80^c, 80^d and 80^e are secured, these gears meshing respectively with the transmission gears 81^a, 81^b, 81^c, 81^d and 81^e which are rotationally loose on shaft 72 but each provided with a key slot 82. The gears 80^a, 80^b, 80^c, 80^d and 80^e are separated by washers 83, while the gears 81^a, etc., are spaced by washers 84. Secured to the outer end of the shaft 72 is the clutch collar 85 which has the ears 86 between which the outer upstanding end 87 of a clutch key 88 is pivoted, the key being within the key-way 89 running along the shaft 72. At the inner end of the key 88 is the clutch tongue or projection 90 which is adapted to engage in the key-ways 82 of any of the gears 81^a, etc. A spring 91 extending downwardly from the key and engaging against the bottom of the key-way 89 tends to force the end 90 radially outwardly. The hand lever 92 has the fork arms 93 and 94 which are pivoted at their upper ends to the frame 71; projections or rollers 95 and 96 on the arms engaging in the groove 85^a of the clutch collar 85.

When the lever 92 is swung the key 88 will be shifted in the key-way 89. The upper corners of the tongue 90 are rounded or beveled away so that the tongue can readily slide past the washers 84 and can readily be shifted into the key-way of the desired gear by the spring 91. The gears 81^a, etc., are always in mesh with the respective gears 80^a, etc., but power will be transmitted from the shaft 66 to the shaft 72 only through that gear which is connected with the shaft 72 by the key 88. When the lever 92 is swung to hold the clutch collar 85 in its outmost position the key 88 is in position to connect the gear 81^a with the shaft 72. If the clutch collar 54 has been shifted to connect the gear 53 with the shaft 50, then this shaft and the vertical shaft 45 will be rotated slowly so that the screw shafts 33 and 37 will be turned very slowly. By shifting the key 88 inwardly from gear to gear the speed of rotation of the screw shaft will be increased. When the sleeve 54 has been shifted to connect the shaft 50 with the gear 52 then the screw shafts will be driven directly from the shaft 66 with which the motor is connected by the chain 69. During such direct drive the gear 81^a, shaft 72, and the gears 73 and 53 will rotate idly.

The screw shafts already described are utilized for effecting raising and lowering of a work supporting frame or cage W. Referring particularly to Figs. 1, 2, 4, 5, 12, 13 and 14, a fitting 100 is secured in each of the corners formed by the longitudinal beams 23 and 24 and the outer transverse beams 25 and 26. Each of these fittings provides a clamp 101 for receiving the upper end of a guide post 102, the four guide posts being each seated at their lower ends in a socket fitting 103. An elevator structure, designated as a whole E, is built up of stock material. As shown, longitudinally extending channel beams 104 and 105 are secured at their left ends to the tops of adjacent parallel transverse channel beams 106 and 107, and at their right ends are secured to similar beams 108 and 109. Spanning and secured to the beams 106 at each end thereof is a supporting plate or base 110 from which the sleeve 111 extends between the beams to receive the respective post 102, the ends of the sleeve being split and adapted to be drawn together by bolts 112. Similar bases and guide sleeves are provided on the beams 108 and 109 for receiving the respective posts 102. As indicated clearly in Figs. 4 and 5, a nut or threaded hub 113 receives the screw shaft 33, this nut having the extensions 114 and 115 projecting into the channel beams 106 and 107, the pivot screws 116 and 117 journaled in the channel bar webs having threaded engagement with said extensions so that the hub will yield to permit it to readily follow the screw shaft. A similar nut 118 is supported in a similar manner by the beams 108 and 109 at the right side of the machine and receives the screw shaft 37. Near the ends of the longitudinal beams 104 and 105 of the elevator structure cross beams 119 and 120, preferably channel bars, are secured with their backs against the tops of the longitudinal beams. At the ends of the beam 119 rods 121 and 122 are hung and from the ends of the beam 120 rods 123 and 124 are hung. The method of suspension of each of these rods is most clearly shown in Fig. 14. The upper end of each rod is threaded and extends through a hole 125 in the respective beam, upper and lower nuts 126 and 127 engaging with the rod and having semi-spherical heads, this construction enabling the rods to be adjusted longitudinally in the beams and to freely swing therefrom.

At their lower ends the rods are adapted to receive the work supporting cage W. As clearly shown in Figs. 1, 2 and 16, this cage or frame comprises two rectangular side frames 128 and 129 preferably of stock bar material. Sets of cross beams 130, 131 and 132, 133 extend between the sides of the frame 128 and similar bars extend between the sides of the frame 129, and at the center of each frame a trunnion stub 134 is supported by the cross bars. At two diagonally opposite corners of each frame angle pieces 135 and 136 are secured with their apexes up. The flanges of each piece being preferably cut or notched away a distance near the apex to leave slots 137 in the pieces into which the respective rods 121, 122, 123 and 124 can pass. Each rod at its lower end is threaded for the nuts 138 and 139 whose heads are semispherical, the engagement of the rods and nuts with the angle pieces being clearly shown in Figs. 1 and 2. When the rods receive the angle pieces the cage or frame W will be suspended from the elevator structure E and will be raised and lowered therewith as the screw shafts are turned.

Figure 2:
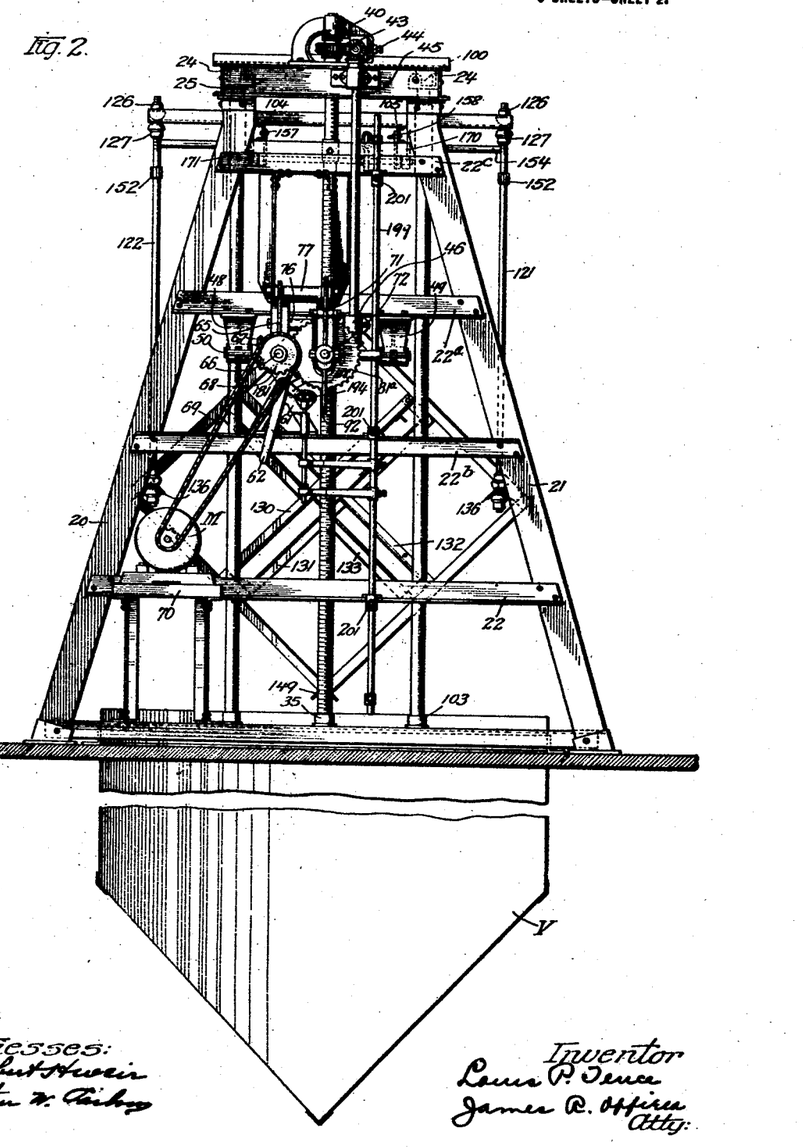
Fig. 2 is a side elevational view.
Figure 3:
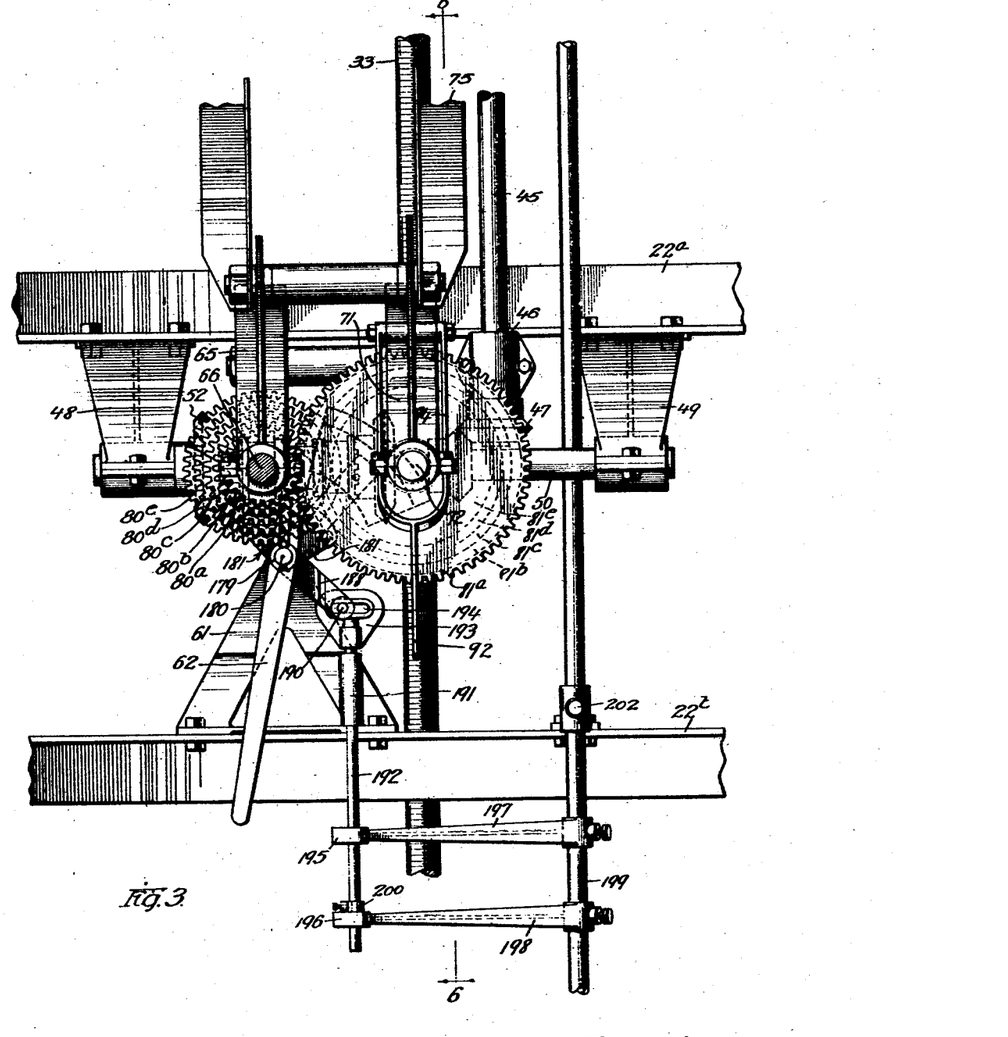
Fig. 3 is an enlarged side elevational view showing particularly the driving gearing and clutch controlling mechanism.
Figures 4, 5:
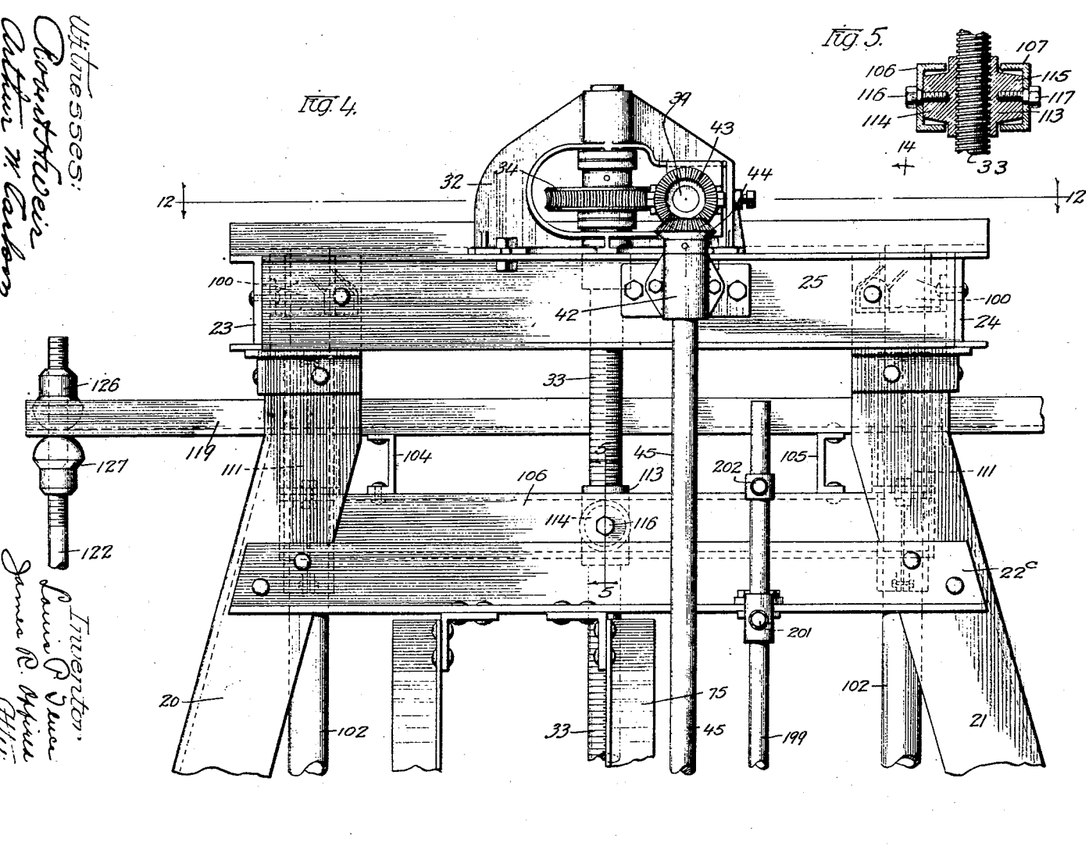
Fig. 4 is an enlarged side elevational view of the upper end of the machine.
Fig. 5 is a sectional view on plane 5—5, Fig. 4.
Figures 6, 7, 8:
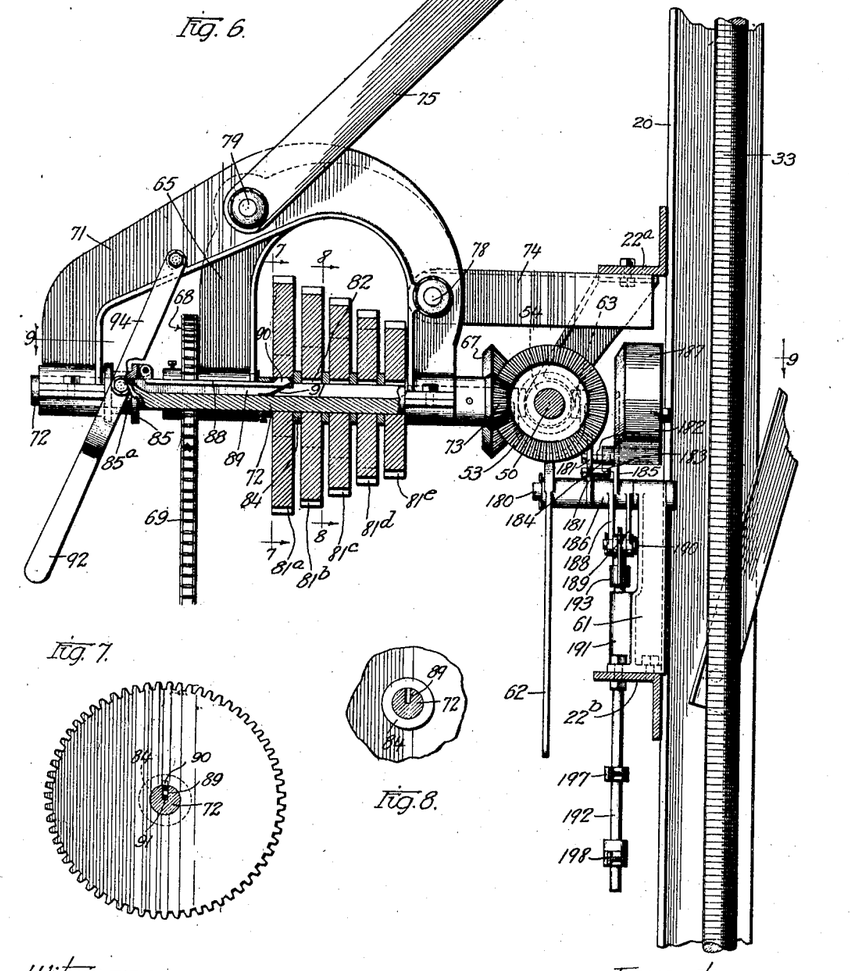
Fig. 6 is a sectional view on plane 6—6, Fig. 3.
Fig. 7 is a view from plane 7—7, Fig. 6.
Fig. 8 is a view from plane 8—8, Fig. 6.
Figures 9, 10, 11:
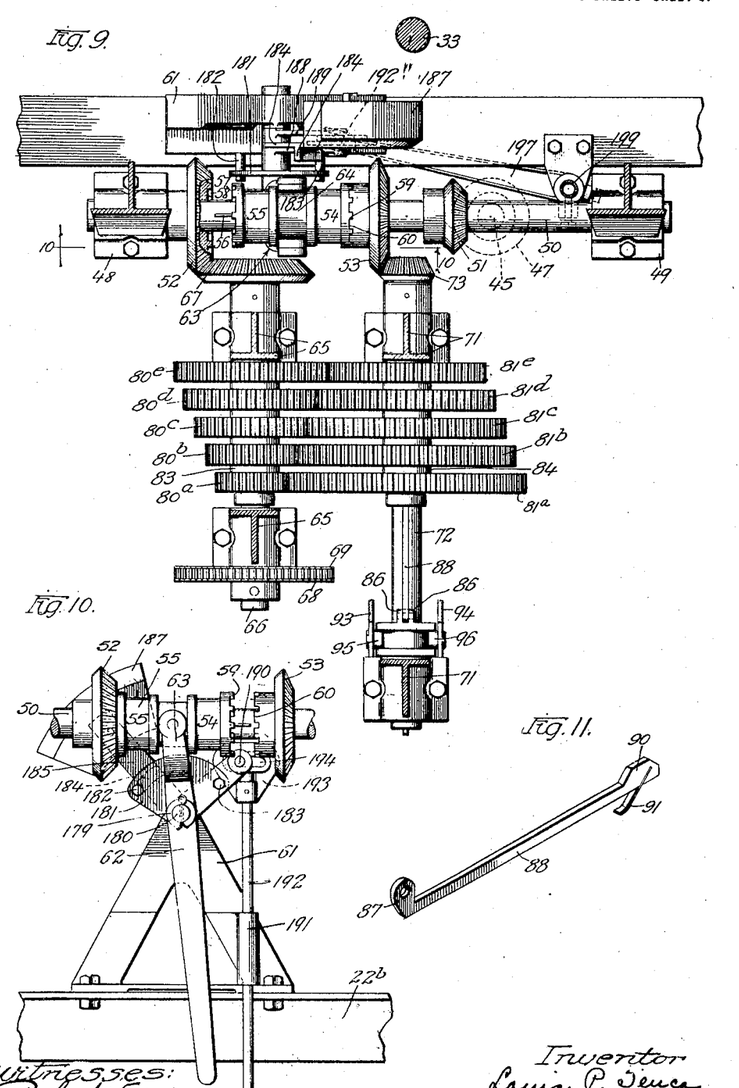
Fig. 9 is a sectional view on plane 9—9, Fig. 6.
Fig. 10 is a view from plane 10—10, Fig. 9.
Fig. 11 is a perspective view of a clutch key.
Figures 12, 13:
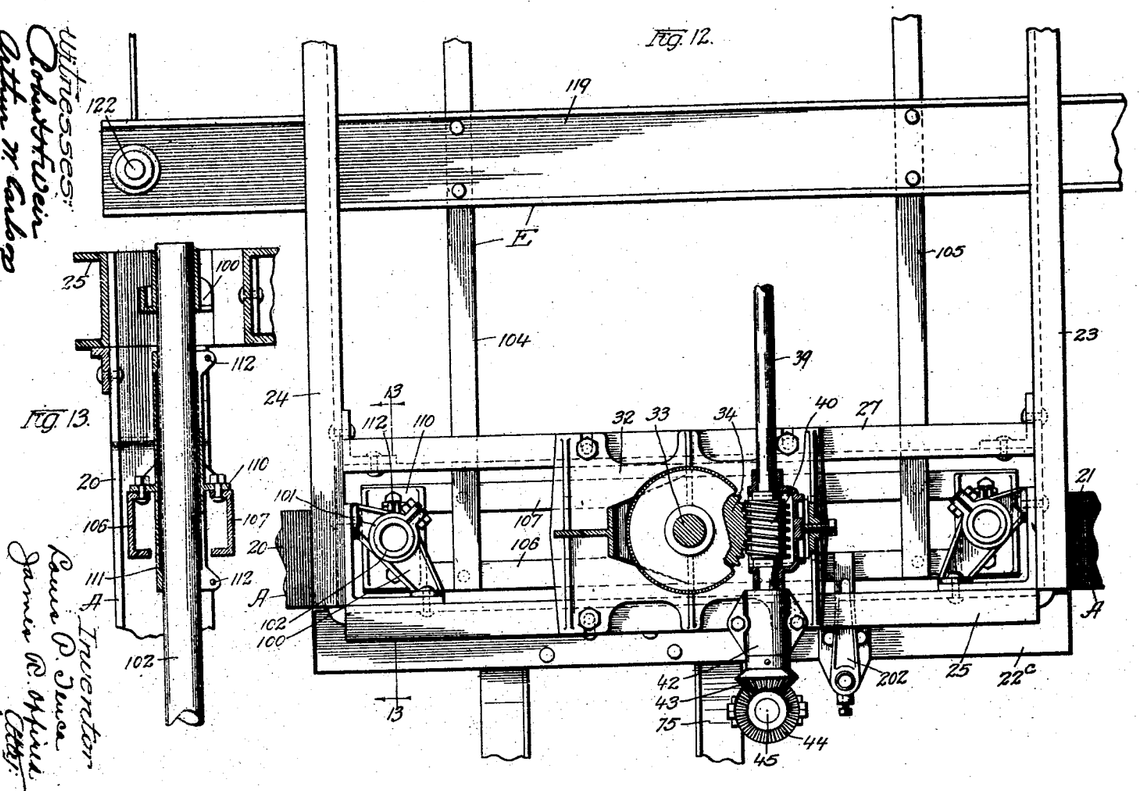
Fig. 12 is a sectional view on plane 12—12, Fig. 4.
Fig. 13 is a sectional view on plane 13—13, Fig. 12.
Figure 16:
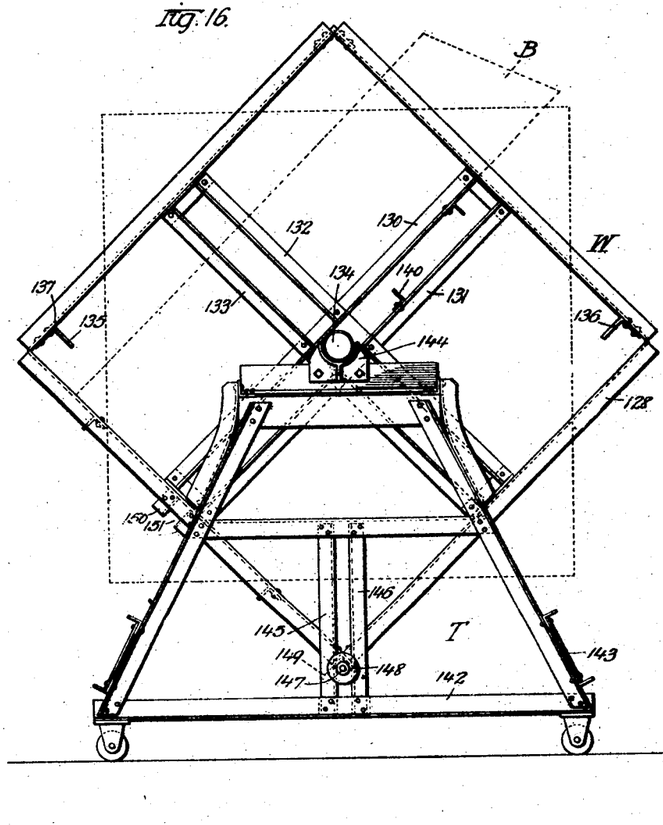
Fig. 16 is a side elevational view of the work holder frame and a supporting truck therefor.

The various cross bars 130, 131, 132 and 133 support longitudinally extending bars 140 whose flanges have holes 141 for receiving screws or nails for securing on the frame W the boards B or other parts and structures which are to be coated. The tank V containing the coating material such as varnish is suspended from and below the floor 31 in position to permit dipping of the frame W therein. During dipping the frame W is preferably held with its diagonals vertical and horizontal as indicated in Fig. 16, this position permitting the base of the tank to be tapered, as shown in Fig. 2. Where the tank is thus conical or tapered much less varnish or other coating substance is required in the tank.

For supporting the frame W while work to be coated is secured thereto, and to receive the frame after a dipping operation, I preferably provide a truck T. This truck may be of any suitable construction. As shown it comprises end frames 142 connected together by beams 143, each side frame having a bearing bracket 144 at its upper end for receiving the trunnion 134 extending from the frame W. On each frame 142 there are guide uprights 145 and 146 spaced apart for the passage therethrough of a shaft 147 which is threadedly engaged at its ends by wheels 148, the arrangement being such that these wheels abut against the outsides of the guides 145 and 146 to lock the shaft 147 at any level. At the lower corner of each of the frames 128 and 129 the angle piece 149 is fitted and secured for receiving the shaft 147 when the frame is applied to the truck with its trunnions 134 engaging in the bearings 144, the frame W being then held in diagonal position as shown in Fig. 16. Sometimes it is more desirable to support the frame W on the truck with its sides vertical, as shown in dotted lines Fig. 16, this position sometimes permitting the work to be more readily arranged on the frame. To lock the frame in this position extensions 150 from one side of the frame form a notch 151 for receiving the shaft 147. The work to be coated is applied to the frame W and then the frame locked in diagonal position by means of the shaft 147 and the angle pieces 149, and then the truck is shifted to carry the frame into the machine in position to receive the rods 121, 122, 123 and 124 in the brackets 135 and 136. Then the screw shafts are turned to raise the frame a sufficient distance to carry its trunnions 134 above the bearings 144 on the truck and to lift the angle pieces 149 clear of the shaft 147. The truck is then taken away and the frame with its load thereon is ready to be lowered into the tank.

Figure 1:
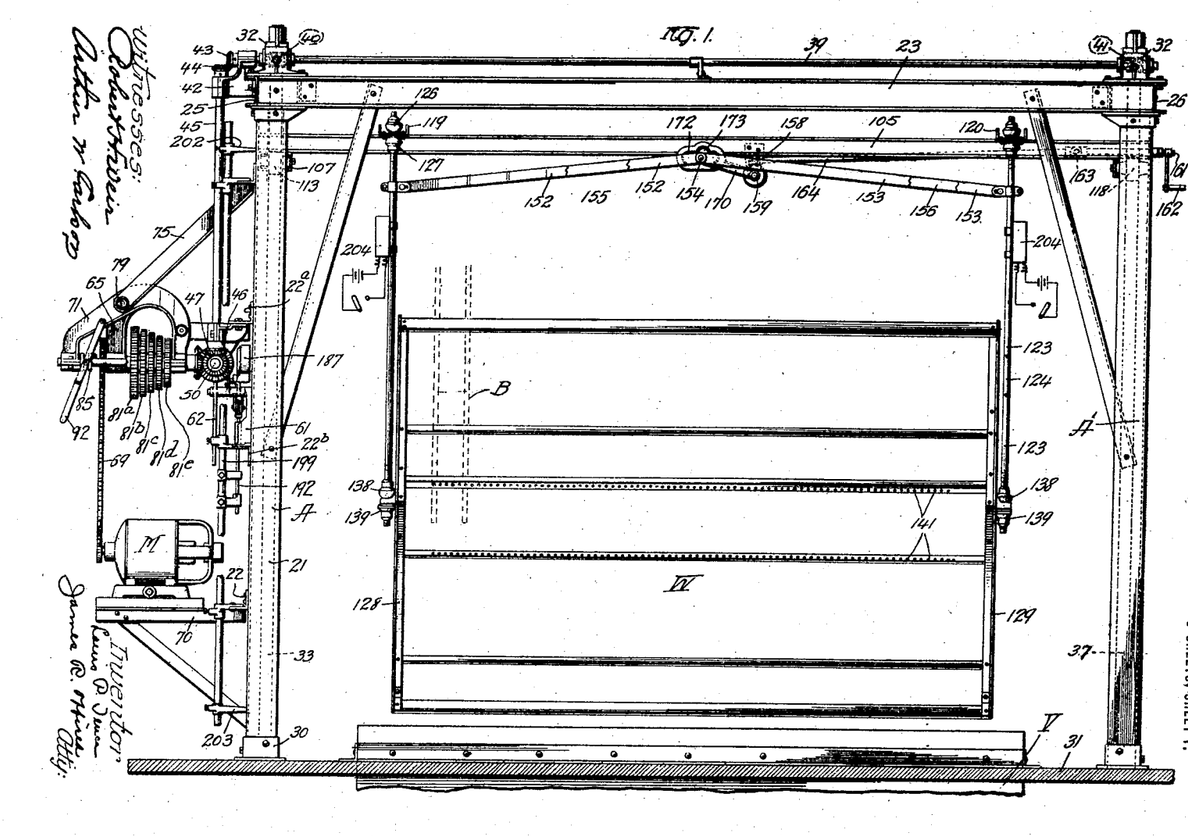
Figure 1 is a front elevational view.

I provide means for readily connecting the rods 121, 122, 123 and 124 with or disconnecting them from the frame W. Referring to Figs. 1, 2, 14 and 15, bars 152 and 153 are pivoted at their outer ends to the rods 121 and 123 and at their inner ends receive the shaft 154 extending across the machine. Similar bars 155 and 156 connect between the shaft 154 and the rods 122 and 124. Near the shaft 154 bearing brackets 157 and 158 depend from the beams 104 and 105 and journal the shaft 159 which is parallel with the shaft 154. In a bearing 160 secured to the beam 109 a shaft 161 is journaled and anchored at its outer end and has the crank 162. A coupling 163 connects the shaft 161 with the shaft 164 which is journaled at its inner end in a bearing housing 165 and supports therein the worm 166. Arms 167 and 168 extending upwardly from the shaft 154 are secured to and support the housing 165 and secured to the shaft 154 between the arms is the worm wheel 169 with which the worm meshes. At the outer ends of the shaft 154, the arms 170 and 171 are secured. Each arm is expanded at its outer end and has the horizontally extending slot 172 through which the shaft 154 extends, the arrangement being such that when the crank 162 is turned the worm 166 will turn the worm wheel 169 and the shaft 154 to swing the arms 170 and 171, the upper and lower sides of the slots 172 then acting against the shaft 154 to swing the bars 152, 153, 155 and 156, these bars acting like toggle links to swing the rods 121, 122, 123 and 124. The arms 170 and 171 have each the notch 173 extending upwardly from the slot 172, these notches receiving the shaft 154 when the arms are swung downwardly after raising thereof. Referring to Fig. 1, the arms have just been raised to swing the bars, 152, 153, 155 and 156 upwardly and to draw the rods 121, 122, 123 and 124 inwardly into engagement with the frame W. When it is now desired to release the frame the crank 162 is turned and the arms 170 and 171 swung downwardly. However, before the bars 152, 153, 155 and 156 are swung downwardly the notches 173 will receive the shaft 154 and then when the bars are swung downwardly they will operate uniformly to swing the rods outwardly to simultaneously release the frame W, which frame will then be received by the truck T which has been shifted in proper position. When the frame W, freshly charged, or another frame, is brought into position at the rods, the crank 162 is turned to swing the arm 170 upwardly to swing the bars upwardly and draw the rods inwardly to receive the frame. The rods will then be locked in parallel relation in engagement with the brackets 135 and 136 on the frame W but the rods can swing with the frame as the shaft 154 is free to shift longitudinally with the slots 172. The frame W can then at all times hang level.

Figures 14, 15:
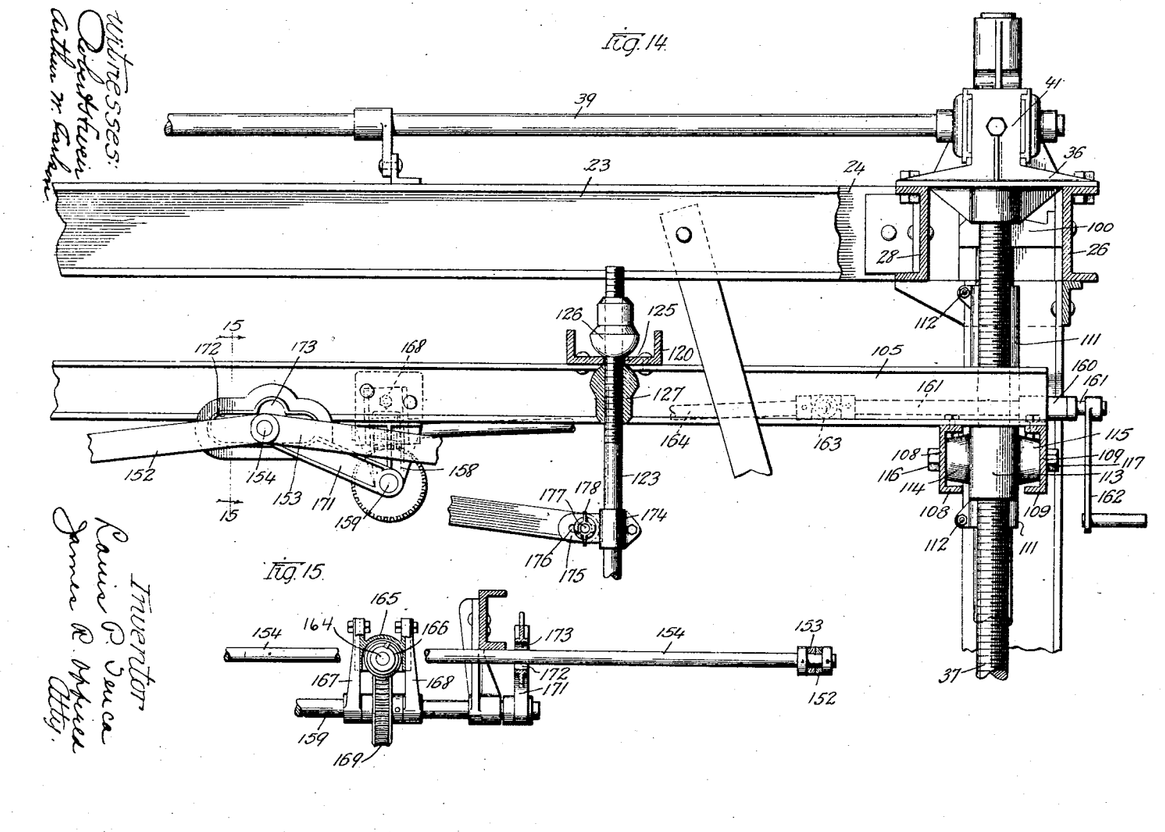
Fig. 14 is an enlarged front elevational view of the upper right hand corner of the machine with parts in section.
Fig. 15 is a sectional view on plane 15—15, Fig. 14.

The bars 152, 153, 155 and 156 are preferably adjustably connected with the rods supporting the frame W. As best shown in Figs. 1 and 14, split sleeves 174 are longitudinally adjustable on the rods and have ears 175 with elongated slots 176 therein through which and through holes in the ends of the bars pivot screws 177 pass, the screws having ring nuts 178. The slots permit longitudinal adjustment of the bars.

The machine can of course be started, stopped or reversed at any time by controlling the circuit of the motor M. In the coating operation it may be desirable to dip the same work several times before it is finally removed from the machine. I therefore preferably provide means for automatically reversing the travel of the elevator structure E. The lever 62 connected with the clutch sleeve 54 has the hub 179 which receives the pin 180 extending from the bracket 61. Extending upwardly from the inner end of the hub is a segmental plate 181 having the pins 182 and 183 at its sides which extend inwardly in the path of the abutment extension 184 and on the arm 185 which extends from the hub 186 also mounted on the pin 180. At the upper end of the arm is secured the weight 187 and extending downwardly from the hub 186 are the arms 188 and 189 whose lower ends support the pin 190. In a vertical lug 191 extending from the bracket 61 a rod 192 is slidable and has secured to its top the head 193 provided with the horizontal slot 194 which receives the pin 190. The rod 192 passes through the forked ends 195 and 196 of the arms 197 and 198 secured to and extending from a vertical bar 199. Secured to the rod 192 between the ends 195 and 196 is the abutment collar 200. The bar 199 is shiftable in bearings 201 secured to the various cross bars 22 of the frame A, screws 202 engaging in each of the brackets for adjusting the frictional shift of the bar through the brackets. At its upper end the bar has the abutment arm 203 extending inwardly in the path of the cross beam 106 of the elevator structure (Fig. 12), the arm extending over the beam to be engaged thereby when the elevator structure approaches the upper end of its travel. A similar abutment arm 203' extends from the bar at its lower end into the path of the beam 106 to be engaged thereby when the elevator structure is down and the frame W is immersed in the tank. Engagement of the beam with the arm 202 will cause upward shift of the bar 199 and upward shift of the rod 192 by the engagement of the arm 198 with the sleeve 200. Engagement of the beam 106 with the arm 203 will shift the bar 199 downwardly and bring its arm 197 against the collar 200 to shift the rod 192 downwardly. Upon raising or lowering of the rod 192 the head 193 will swing the arms 188 and 189 and consequently the weight 187. As soon as the weight passes the vertical plane through the pin 180 it will continue its movement and its arm 185 will strike the corresponding pin 182 or 183 so that the plate 181 and the lever 62 will be swung to shift the clutch sleeve 54, from one position to the other. In the arrangement of Figs. 1, 2, 3 and 9, the elevator structure E is reaching the upper end of its travel, the beam 106 being in engagement with the abutment arm 102 and the arm 198 being in engagement with the collar 200 on the rod 192. As soon as this rod is raised far enough to swing the weight a distance beyond the center plane the lever 162 will be swung its full distance by the engagement of the weighted arm against the pin 182 and the clutch sleeve 54 will be released from the gear 53 and clutched to the gear 52 so that the screw shafts will then be rotated in the opposite direction and the elevator structure E will travel downwardly. When the beam 106 reaches the arm 203 and the bar 199 is shifted downwardly, the arm 197 by engaging with the collar 200 will shift the rod 192 downwardly and the weighted arm will be swung through the center plane and then against the pin 183 to throw the lever 62 back to shift the clutch sleeve 54 into engagement with the gear 53. The elevator structure will therefore automatically be raised and lowered and the work supporting frame alternately dipped into and withdrawn from the coating solution in the tank. During operation of the machine when the gear 53 is clutched to the shaft 50 the speed can be changed by swinging the lever 92 to shift the key 88 to bring any one of the gears 81ª, etc., into driving engagement with the shaft 72. The lever 62 is also free at any time to be swung manually to shift the clutch sleeve 54 where desired.

As the rods supporting the frame W are locked in parallel relationship by the toggle mechanism the frame will always be horizontal and the boards or frame parts thereon which are to be coated will always be vertical, and the buoyant effect of the coating liquid cannot disturb this condition. It is known that after coating of an object a sudden blow or bump thereon will cause the coating material to pile up or become wavy. Bumps and jolts are of course very apt to happen during handling of the frames containing the coated objects but I have found that if the frame and the objects thereon are rapidly vibrated the coating will remain smooth in spite of bumps or jolts. Such rapid vibration can be accomplished by mechanical or electrical means. I have shown vibrating devices 204 constructed on the principle of the electrical buzzer or bell, and I preferably connect one or more of these devices with the rods or other parts connected with the frame W. These devices put the frame W under high frequency vibration and this vibration not only prevents piling or perceptible waving of the coating but assists in propelling surplus coating material to the lower corners of the coated objects.

My improved machine is of simple and reliable construction and can be accurately and readily controlled. The parts being coated are always held in the proper position in the fluid and the construction and arrangement is such that the flotation force of the liquid cannot introduce unbalancing or strains, the machine therefor operating smoothly and easily with a driving source of comparatively small capacity. As the rectangular object supporting frame is held with its diagonals vertical and horizontal, and the liquid tank has a corresponding diagonal bottom, less fluid is necessary and the cost of operating the machine is therefore considerably reduced.

I do not of course desire to be limited to the exact construction, arrangement and operation shown and described as changes and modifications can no doubt be made which would still come within the scope of the invention.

I claim as follows:

1. In a machine of the class described, the combination of a tank, a supporting structure, vertical screw shafts, means for controlling the rotation of said shafts, and an article supporting frame connected with said screw shafts to be raised and lowered.

2. In a machine of the class described, the combination of a tank, a supporting structure, vertical screw shafts journaled thereon, means for controlling the rotation of said screw shafts, an elevator frame connected with said screw shafts to be raised and lowered, and an article supporting frame suspended from said elevator structure.

3. In a machine of the class described, the combination of a tank, a supporting structure, vertical screw shafts journaled thereon, means for controlling the rotation of said screw shafts, an elevator frame connected with said screw shafts to be raised and lowered, and an article supporting frame suspended at four points from said elevator structure.

4. In a machine of the class described, the combination of a tank, a supporting structure, vertical screw shafts journaled on said structure, means for controlling the rotation of said screw shafts, an elevator frame connected with said screw shafts to be raised and lowered, rods pivoted at their upper ends to said elevator frame, an article supporting frame, and means for detachably connecting the lower ends of said rods to said article supporting frame.

5. In a device of the class described, the combination of a tank, a supporting structure, an elevator frame mounted thereon to be raised and lowered, rods hung from said elevator frame, an article supporting frame, means for detachably connecting the lower ends of said rods with said article supporting frame at the sides thereof.

6. In a machine of the class described, the combination of a tank, a supporting structure, an elevator frame and means for raising and lowering it on said structure, rods pivoted at their upper ends to hang from said elevator frame, an article supporting frame, means for detachably connecting the lower ends of said rods with the sides of said article supporting frame, and means connecting with the upper ends of said rods for swinging them apart to release the article supporting frame and for drawing them together to receive the supporting frame.

7. In a machine of the class described, the combination of a tank, a supporting structure, an elevator frame and means for raising and lowering it on said structure, rods pivoted at their upper ends to hang from said elevator frame, an article supporting frame, means for detachably connecting the lower ends of said rods with the sides of said article supporting frame, and toggle mechanism connecting with the upper ends of said rods for swinging them apart to release the article supporting frame and for drawing them together to receive the supporting frame.

8. In a machine of the class described, the combination of a tank, a supporting structure, an elevator frame and means for raising and lowering it on said structure, rods pivoted at their upper ends on said elevator frame, an article supporting frame, means for detachably engaging the lower ends of said rods with the sides of said supporting frame, toggle levers pivoted together at their inner ends and connected at their outer ends with said rods, and means for vertically shifting the pivoted together ends of said levers whereby to swing said arms together into engagement at their lower ends with said supporting frame or to swing said arms apart to release said frame.

9. In a machine of the class described, the combination of a tank, a supporting structure, an elevator frame mounted on said structure, means for raising and lowering said frame, a pair of rods pivoted at their upper ends at each side of the elevator frame, an article supporting frame, means for connecting the lower ends of the rods of each of the respective sets with the respective ends of the supporting frame at the sides thereof whereby to suspend said supporting frame at four points from the elevator frame.

10. In a machine of the class described, the combination of a tank, a supporting structure, an elevator frame mounted on said structure, means for raising and lowering said frame, a pair of rods pivoted at their upper ends at each side of the elevator frame, an article supporting frame, means for connecting the lower ends of the rods of each of the respective sets with the respective ends of the supporting frame at the sides thereof whereby to suspend said supporting frame at four points from the elevator frame, and means for swinging said rod sets toward and away from each other into engagement with the article supporting frame or to disengage them therefrom.

11. In a machine of the class described, the combination of a tank, a supporting structure, an elevator frame mounted on said structure, means for raising and lowering said frame, a pair of rods pivoted at their upper ends at each side of the elevator frame, an article supporting frame, means for connecting the lower ends of the rods of each of the respective sets with the respective ends of the supporting frame at the sides thereof whereby to suspend said supporting frame at four points from the elevator frame, and toggle mechanism connected with the rod sets for swinging the rods to become engaged with the article supporting frame or to become disengaged therefrom.

12. In a machine of the class described, the combination of a tank, a supporting structure, an elevator frame shiftable vertically on said structure, rods hinged at their upper ends to said elevator frame to swing laterally, abutments at the lower ends of said rods, an article supporting frame having slots at its ends for receiving the lower ends of said rods above said abutments whereby said supporting frame will be suspended from said elevator frame by said rods.

13. In a machine of the class described, the combination of a tank, a supporting structure, an elevator frame shiftable vertically on said structure, rods hinged at their upper ends to said elevator frame to swing laterally, abutments at the lower ends of said rods, an article supporting frame having slots at its ends for receiving the lower ends of said rods above said abutments whereby said supporting frame will be suspended from said elevator frame by said rods, and means for simultaneously swinging said rods to engage them in or disengage them from said slots.

14. In a machine of the class described, the combination of a tank, a supporting structure, a rectangular elevator frame supported on said structure, means for raising and lowering said elevator frame, a rod pivoted at its upper end at each corner of said elevator frame, an article supporting frame, means for detachably connecting the lower ends of said rods to the ends of said supporting frame, and means for locking said rods parallel relative to each other and in supporting connection with said article supporting frame.

15. In a machine of the class described, the combination of a tank, a supporting structure, a rectangular elevator frame supported on said structure, means for raising and lowering said elevator frame, a rod pivoted at its upper end at each corner of said elevator frame, an article supporting frame, means for detachably connecting the lower ends of said rods to the ends of said supporting frame, a pair of toggle levers pivoted at their outer ends to the front rods on said elevator frame, a pair of toggle levers pivoted at their outer ends to the rear rods of said elevator frame, a pivot rod to which the toggle levers of each pair are pivoted, and means for vertically shifting said pivot rod whereby to swing the bars into engagement at their lower ends with said article supporting frame or to release them from said frame.

16. In a machine of the class described, the combination of a tank, a supporting structure, a rectangular elevator frame supported on said structure, means for raising and lowering said elevator frame, a rod pivoted at its upper end at each corner of said elevator frame, an article supporting frame, means for detachably connecting the lower ends of said rods to the ends of said supporting frame, a pair of toggle levers pivoted at their outer ends to the front rods on said elevator frame, a pair of toggle levers pivoted at their outer ends to the rear rods of said elevator frame, a pivot rod to which the toggle levers of each pair are pivoted, means for vertically shifting said pivot rod to swing said rods into parallelism and lock them in engagement with said article supporting frame, or to spread them apart to release said frame, said pivot rod being free to move a limited distance laterally when said rods are locked in parallelism whereby said article supporting frame may swing laterally from one position into another parallel position.

17. In a machine of the class described, the combination of a supporting structure, an elevator frame on said structure, a driving motor, transmission mechanism for connecting said motor in driving relation with said elevator frame, a coating material containing tank below said elevator frame, an article supporting frame hung from said elevator frame to be dipped into said tank for the application of coating material to supported articles, and means for controlling said transmission mechanism to cause the direction of travel of said elevator frame to be automatically reversed when said frame is in its upper and lower positions.

18. In a machine of the class described, the combination of a tank, a supporting frame, an elevator frame supported thereby, a driving motor, forward and reverse transmission trains for connecting said motor with said elevator frame to cause raising and lowering thereof, an article supporting frame hung from said elevator frame, and clutch mechanism controlled by the movements of said elevator frame for automatically alternately connecting said forward and reverse transmission trains in service.

19. In a machine of the class described, the combination of a supporting structure, an elevator frame supported thereby for vertical travel, a driving motor, a transmission train for connecting said motor with said elevator frame to cause movement thereof in one direction, a second transmission train for connecting said motor with said elevator frame to cause reverse movement thereof, means for controlling said reverse transmission train to cause different speeds of movement of said elevator frame, a clutch for selectively connecting said transmission trains for service, means controlled by said elevator frame for automatically shifting said clutch mechanism to alternately connect said transmission trains for service, a coating fluid containing tank below said elevator frame, and an article supporting frame hung from said elevator frame.

20. In a machine of the class described, the combination of a tank, a supporting structure, an elevator frame supported by said structure, a driving motor, a main shaft connected with said motor, a plurality of gears of different diameters secured on said shaft, a counter shaft, a plurality of gears loosely mounted on said counter shaft and meshing with the gears on said main shaft, a cross shaft, a transmission train connecting said cross shaft with said elevator frame, clutch mechanism for connecting either said main shaft or counter shaft with said cross shaft, and means for securing to the counter shaft any one of the gears mounted thereon.

21. In a machine of the class described, the combination of a tank, a supporting structure, an elevator frame supported on said structure for vertical travel, a rectangular article supporting frame, and rods suspending said article supporting frame from said elevator frame to permit swing thereof but to maintain its axis horizontal.

22. In a mechanism of the class described, the combination of a tank, an elevator structure, of an article supporting frame having trunnion extensions from its ends whereby it may be supported for axial rotation, brackets extending from the ends of said frame, and rods extending from said elevator structure and having detachable connection with said brackets.

In witness whereof, I hereunto subscribe my name this 19th day of August, A. D. 1918.

LOUIS P. TENCA.